United States Patent [19]

Sridhar et al.

[11] Patent Number: 4,678,523

[45] Date of Patent: Jul. 7, 1987

[54] CORROSION- AND WEAR-RESISTANT DUPLEX STEEL

[75] Inventors: Narasi Sridhar, Carmel; Paul Crook, Kokomo, both of Ind.

[73] Assignee: Cabot Corporation, Kokomo, Ind.

[21] Appl. No.: 882,552

[22] Filed: Jul. 3, 1986

[51] Int. Cl.$^4$ ............................................ C22C 38/52
[52] U.S. Cl. .................................. 148/325; 148/327; 148/442; 75/246
[58] Field of Search ..................... 420/35–39, 420/49, 50, 52; 148/325, 327; 75/246

[56] References Cited

U.S. PATENT DOCUMENTS 2,306,662 12/1942 Krivobok ............................... 420/38
2,750,283 6/1956 Loveless ................................ 420/36
4,487,630 12/1984 Crook et al. ........................... 420/36
4,640,817 2/1987 Kajimura et al. ...................... 420/50

*Primary Examiner*—L. Dewayne Rutledge
*Assistant Examiner*—Deborah Yee
*Attorney, Agent, or Firm*—Joseph J. Phillips

[57] ABSTRACT

Disclosed is a "duplex" stainless steel especially suited for use in conditions requiring a high degree of wear and corrosion resistance; for example structural fasteners, such as nuts and bolts as used in chemical processing. The alloy typically contains, in weight percent, 12 cobalt, 20 chromium, 11 nickel, 5 silicon, 1.5 molybdenum, 2 copper, up to 0.2 nitrogen and up to 0.01 carbon. The "duplex" structure preferably consists of about 30% ferrite and the balance essentially austenite.

5 Claims, 1 Drawing Figure

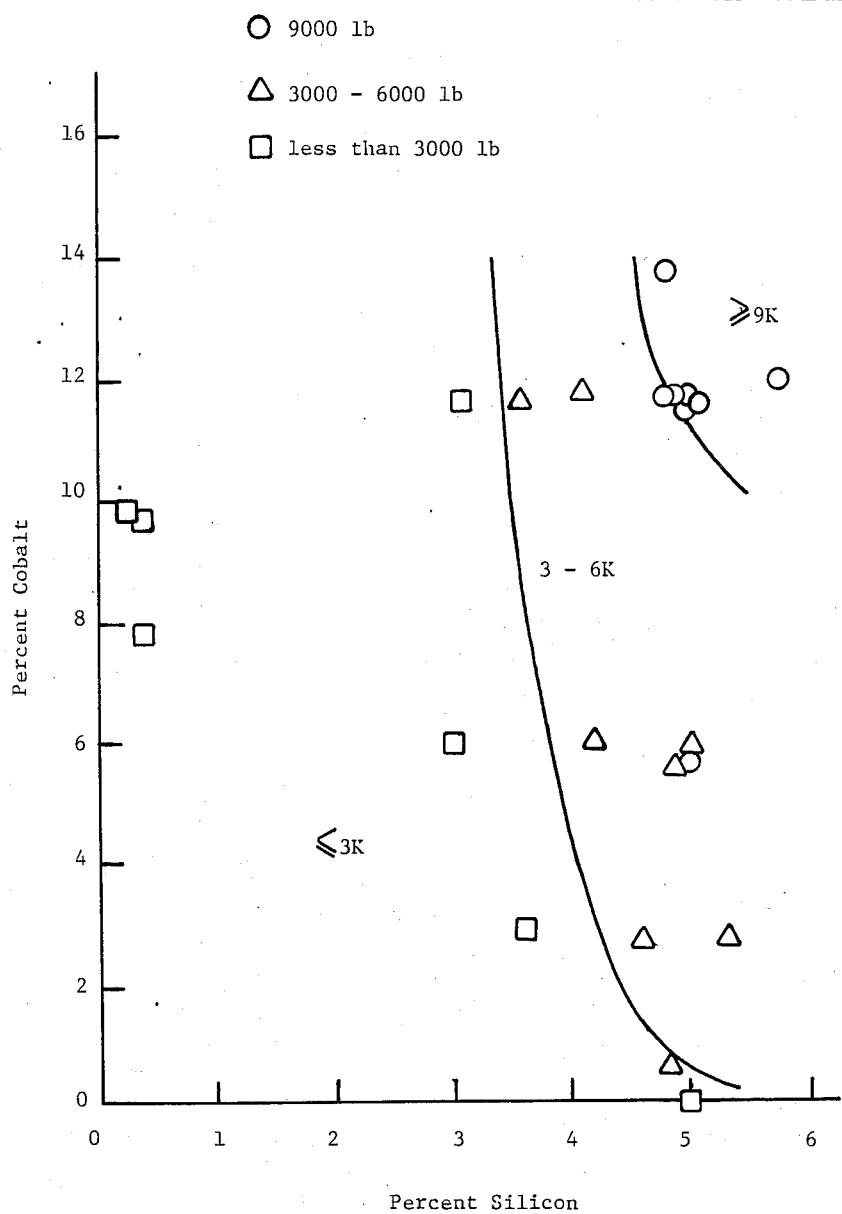

CORROSION- AND WEAR-RESISTANT DUPLEX STEEL

FIELD OF THE INVENTION

This invention relates to a duplex stainless steel especially resistant to the corrosion of highly oxidizing acids such as high concentrations of sulfuric acid and having a high degree of resistance to wear.

BACKGROUND AND PRIOR ART

Sulfuric acid at high levels of concentrations over 75% and especially 90 to 99% is particularly corrosive to metal vessels and apparatus handling it. For the most part, higher cost nickel-base alloys have been used in the manufacture of such articles, limited to the form of castings. U.S. Pat. No. 3,311,470 discusses the problem in great detail. The specification clearly presents the problems in the commercial handling of high concentrations of sulfuric acid.

U.S. Pat. No. 3,615,368 discloses the effects of nitrogen in a corrosion-resistant steel containing chromium, nickel and silicon. The steel may also contain molybdenum and manganese. U.S. Pat. No. 4,487,630 discloses a wear-resistant steel containing chromium, nickel, silicon, carbon and cobalt plus optional contents of manganese, molybdenum, tungsten, vanadium, zirconium, tantalum, columbium, boron, titanium and hafnium. U.S. Pat. Nos. 4,033,767 and 3,758,269 relate to nickel-chromium alloys that are rich in silicon and corrosion resistant. All of the patents described above, as a group, disclose alloys that have wear-resistant characteristics and corrosion-resistant characteristics; however, none has a good combination and balance of both characteristics together with a high degree of ductility and low cost.

There is a great need in the chemical industry for a low cost alloy that (1) may be produced in the form of wrought products; (2) is resistant to sulfuric and other acids; (3) has good strength and ductility and (4) is readily weldable. Furthermore, the alloy must have a high degree of galling-wear and stress corrosion cracking resistance for use in industrial applications. In actual practice, the present art has no ideal solution to the problem. The high cost nickel-base alloys generally are difficult to produce, shape and weld in chemical processing applications. The wroughtable nickel-base alloys do not have adequate wear resistance.

BRIEF DESCRIPTION OF THE DRAWING

The drawing shows the critical relationship of cobalt and silicon on the wear-resistant properties of the alloy of the invention.

OBJECTS OF THE INVENTION

It is the principal object of this invention to provide a stainless steel that has the combination of features mentioned above.

Other objects and advantages may be discerned by the data, discussions and claims herein described.

SUMMARY OF THE INVENTION

These objects are provided by the alloy of this invention as described in Table 1. The alloy of this invention requires a critical ratio of cobalt to silicon to obtain the full benefits of this invention. The silicon content must not exceed the cobalt to obtain the best combination of sufficient ductility, wear-resistance, corrosion-resistance and mechanical strength. The FIGURE shows the effect of cobalt and silicon in wear-(galling) resistant properties. The FIGURE shows that both cobalt and silicon above certain percentages are necessary for galling resistance. But they should be present in a critical ratio and the appropriate microstructure, i.e., a combination of austenitic and ferritic structure. If the microstructure is fully austenitic then the galling resistance is completely lost. If the microstructure is fully ferritic, then the alloy is so brittle that it is unmakable. This microstructure is attained by controlling the ratio of ferrite forming elements (Cr, Si, Mo) and austenite forming elements (Ni, Co, C, N). The relationship between these two groups of elements is usually obtained by processing and heat treatment, as known in the art. For optimum galling resistance, it is preferred that the volume percentage of ferrite should be about 30%; however, some benefits are obtained with values as low as 5%.

Nickel is necessary within the ranges in Table 1 to provide ductility for processing into wrought products—i.e., sheet, foil, wire and the like. Lower nickel contents will not be effective while higher contents make the alloy fully austenitic and hence reduce the wear resistance.

Chromium, within the ranges in Table 1, provides corrosion resistance, especially in sulfuric acid and saline solutions. Lower chromium contents may be ineffectual while higher chromium contents will yield less ductile alloys.

Molybdenum, copper and nitrogen may be present within the ranges given in Table 1. Molybdenum is essential when the alloy is used in saline solutions and dilute sulfuric acids. Tungsten contents may accompany molybdenum. However, molybdenum and tungsten must be controlled within the limits given in Table 1 as higher amounts will embrittle the alloy. Copper is essential for use in dilute sulfuric acids. However, copper in amounts higher than given in Table 1 does not create any added benefit and may increase the cost of the alloy. Nitrogen is well-known in the art of stainless steel causing it to increase the corrosion resistance to saline solution and to stabilize the austenite phase thus providing ductility.

Carbon is an unavoidable impurity. Cobalt and silicon are required in the alloy, not only within the ranges given in Table 1, but also within the critical relationship as shown in Table 1.

The compositions in Table 1 contain "iron plus impurities" as balance. In the production of iron-base alloys of this class, impurities from many sources are found in the final product. These so-called "impurities" are not necessarily always harmful and some may actually be beneficial or have an innocuous effect; for example, manganese, columbium, tantalum, titanium, lanthanum and the like.

Some of the "impurities" may be present as residual elements resulting from certain processing steps, or be adventitiously present in the charge materials; for example, magnesium and aluminum.

In actual practice, certain impurity elements are kept within established limits with a maximum to obtain uniform products, as is well-known in the art and skill of melting and processing these alloys. Sulfur, phosphorus and carbon must generally be kept at low levels.

Thus, the alloy of this invention may contain these and other impurities usually associated with alloys of this class and as recited in commercial specifications.

EXPERIMENTAL DATA AND EXAMPLES

The alloy of this invention has a high degree of both corrosion resistance and wear resistance and ductility. These characteristics are generally mutually exclusive in commercial alloys of this class. The good combination of corrosion and wear resistance along with ductility in an alloy is highly desirable in the metals art.

Table 2 shows that in highly oxidizing, acidic solutions, chromium alone does not offer protection. This is because, under these conditions, the protective chromium oxide film dissolves in the solution exposing the alloy. However, presence of even 3% Si effects considerable improvement to the film stability. This effect is rather unexpected and not well understood. Alloys N-1, N-2 and N-3 are nickel-base alloys with no silicon additions. Alloy PA-1 is a stainless steel with no silicon addition. Alloys A, B, and C are alloys within the range shown in Table 1 with various contents of silicon. These data clearly show the need for silicon in addition to chromium for corrosion resistance.

TABLE 1

ALLOY OF THIS INVENTION
COMPOSITION, IN WEIGHT PERCENT (WT %)

|   | BROAD | INTERMEDIATE | PREFERRED |
|---|---|---|---|
| C | .1 Max. | 0.06 Max. | 0.01 |
| Co | 6–16 | 10–14 | 12 |
| Cr | 16–26 | 19–21 | 20 |
| Ni | 7–20 | 9–13 | 11 |
| Si | 3–6 | 4.5–5.5 | 5 |
| Mo | 0–4 | 1–3 | 1.5 |
| Cu | 0–3 | 1–3 | 2.0 |
| $N_2$ | .4 Max. | .2 Max. | .2 Max. |
| Co/Si | 1–4.5 | 1.5–3.5 | About 2.5 |
| Fe + Impurities | Balance | Balance | Balance |

TABLE 2

EFFECT OF Si ADDITION TO Cr ON CORROSION
RESISTANCE TO 10% CHROMIC ACID, BOILING

| ALLOY | COMPOSITION, WT % | CORROSION RATE (MPY) |
|---|---|---|
| N-1 | Ni - 16 Cr - 16 Mo - 4 W | 50–90 |
| N-2 | Ni - 22 Cr - 7 Mo - 20 Fe | 113–116 |
| N-3 | Ni - 29.5 Cr - 5 Mo - 15 Fe | 60 |
| PA-1 | Fe - 26 Cr - 3 Mo - 6 Ni - 0.2 N | 160–200 |
| A* | Fe - 20 Cr - 3 Si - (Co, Ni, Mo) | 25 |
| B* | Fe - 20 Cr - 4 Si - (Co, Ni, Mo) | 16 |
| C* | Fe - 20 Cr - 5 Si - (Co, Ni, Mo) | 11 |

*Alloys A, B, and C are alloys of this invention.

Table 3 presents data relating to the welding characteristics of the alloy of this invention. Generally, high silicon contents in Fe-Ni-Cr alloys are extremely detrimental to weld cracking resistance. However, suitable mix of alloying elements (Cr, Mo, Ni, Co), to yield a certain amount of ferrite phase in an austenite phase (duplex microstructure), will increase the weld cracking resistance considerably.

A series of alloys were produced with the preferred composition as disclosed in Table 1, except for the silicon content. Alloys W-1 to W-4 are essentially in the austenite phase; Alloy W-5 contains about 30% ferrite. The alloys were 0.25 inch plates, tungsten inert gas (TIG) welded using a matching filler and given a 2-T bend test. Note that the silicon content varied from 3.1% to 5.2% in Alloys W-1 to W-4 and all specimens failed. Specimens made from W-5 alloy containing 30% ferrite passed the test with no cracking—even when tested more severely with specimens made from 0.50 inch thick plate.

These test data show that the duplex structure is preferred for use in welding applications.

TABLE 3

WELDABILITY

| ALLOY | FERRITE | % Si | OBSERVATION |
|---|---|---|---|
| W-1 | 0 | 3.1 | Cracked, Some Bending Possible |
| W-2 | 0 | 4.3 | Cracked, No Significant Bending |
| W-3 | 0 | 4.8 | Cracked While Welding |
| W-4 | 0 | 5.2 | Cracked While Bending |
| W-5 | 30 | 4.9 | No Cracking |

Table 4 presents data showing the effects of molybdenum and copper on corrosion resistance in 90% sulfuric acid at 80° C.

A series of alloys was melted within the broad range, shown in Table 1, with silicon, molybdenum and copper contents, as shown in Table 4.

These data show that molybdenum and copper are effective in obtaining optimum corrosion resistance when the alloy may be subjected to 90% sulfuric acid conditions.

Shown in Table 5 is the beneficial effect of molybdenum in saline solutions. The mode of corrosion in these types of solutions is pitting. The resistance to pitting corrosion is evaluated in terms of a critical pitting temperature, the higher this number, the higher being the resistance to pitting. Duplicate samples are immersed in the solution shown in Table 5 at different temperatures for 120 hours, taken out and examined under a microscope at a magnification of 40X. The temperature at which pits are observed on at least one of the samples, is taken as the critical pitting temperature.

In the data shown in Table 5, alloys of essentially the same composition as the intermediate composition shown in Table 1 but with varying molybdenum contents were melted, processed and tested for pitting resistance. It can be seen that the higher the molybdenum, the higher the pitting resistance. However, beyond 3% molybdenum the alloy becomes very brittle.

TABLE 4

EFFECT OF Mo AND Cu ON CORROSION
RESISTANCE IN 90% $H_2So_4$ AT 80° C.

| COMPOSITION, WT % | | | |
|---|---|---|---|
| Si | Mo | Cu | CORROSION RATE (MPY) |
| 4.6 | — | — | 1000 |
| 4.6 | 1.9 | — | 90 |
| 5.0 | 3.1 | — | 49 |
| 4.8 | — | 2.1 | 35 |
| 4.7 | 1.4 | 2.3 | 24 |

TABLE 5

BENEFICIAL EFFECTS OF MOLYBDENUM ON
RESISTANCE TO SALINE SOLUTION. CRITICAL
PITTING TEMPERATURE IN AN AQUEOUS
SOLUTION OF 1000 PPM CHLORIDE PLUS
1 GM/LITER FERRIC SULFATE AT pH = 2.

| ALLOY | COMPOSITION | CRITICAL PITTING TEMPERATURE °C. |
|---|---|---|
| 1 | Fe - 21 Cr - 4.9 Si - 0 Mo - (Ni, Co) | 35 |
| 2 | Fe - 20 Cr - 4.6 Si - 2 Mo - (Ni, Co) | 45 |
| 3 | Fe - 20 Cr - 5 Si - 3 Mo - (Ni, Co) | 45–50 |

The FIGURE shows the effects of cobalt and silicon contents on the galling, wear resistance of the alloy. A series of alloys were produced within the composition scope of the intermediate range shown in Table 1. Cobalt and silicon contents were varied as indicated by the points in the FIGURE. The symbols indicate the threshold load: circles indicate at least 9000lbs.; triangles indicate 3000 to 6000lbs.; squares indicate less than 3000bs

GALLING TEST

The galling test consists of rotating, under pressure, a cylindrical pin against a block of the same alloy and measuring the resultant damage. The compressive load is applied by a screw-driven machine and is measured. The pin is rotated back and forth against the block 10 times through an angle of 120°. The damage on the block sample then is measured using a profilometer, which measures the amplitude of surface damage created. Duplicate tests are run at each load. The galling resistance is compared in terms of a threshold load at which the maximum galling damage exceeds 10 microns.

Note alloys containing about 8 to 10% cobalt and little or no silicon had the lowest wear resistance. Alloys with 3 to 4% silicon and 12, 6 and 3% cobalt also had the lowest wear resistance.

An alloy containing 5% silicon and zero cobalt also had the lowest wear resistance.

However, alloys containing about 4 to 5.5% silicon and 12, 6 and 3% cobalt had intermediate wear resistance.

Note that the highest wear resistance was obtained with alloys containing 5 to 6% silicon and over 6% cobalt.

These data clearly show that cobalt and silicon are required for maximum galling resistance. One cannot replace the other. Thus, the presence of cobalt, about 12%, and silicon, about 4.5%, are essential for the highest degree of galling resistance, as indicated by the threshold load for galling. All alloys shown in the FIGURE have a ferrite-austenite duplex microstructure. If the microstructure became fully austenitic, the galling threshold load was below 3000bs regardless of the contents of cobalt and silicon.

The alloy of this invention may be produced by any process now used in the manufacture of stainless steels of this class, for example, duplex steels. The alloy may be produced in the form of castings and the form of powder for known powder metallurgy processing. The alloy has been readily welded and may be used as articles for welding: i.e., welding wire, etc. The hot and cold working properties of this alloy permit the production of hot and cold rolled thin sheet, tubing and other commercial forms.

In the foregoing specification, there has been set out certain preferred embodiments of this invention, however, it will be understood that this invention may be otherwise embodied within the scope of the following claims.

What is claimed is:

1. A stainless steel having a duplex structure consisting of about 5 to 60% ferrite and the balance essentially austenite consisting essentially of, in weight percent, less than 0.1 carbon, 6 to 16 cobalt, 16 to 26 chromium, 7 to 20 nickel, 3 to 6 silicon, up to 4 molybdenum, up to 3 copper, less than 0.4 nitrogen, and the balance iron plus impurities, wherein the ratio of cobalt to silicon is between 1 and 4.5 to provide a desirable combination of wear and corrosion resistance to the steel.

2. The stainless steel of claim 1 wherein alloy contains less than 0.06 carbon, 10 to 14 cobalt, 19 to 21 chromium, 9 to 13 nickel, 4.5 to 5.5 silicon, 1 to 3 each molybdenum and copper, up to 0.2 nitrogen, and the ratio is between 1.5 and 3.5.

3. The stainless steel of claim 1 wherein the alloy contains less than about 0.01 carbon, about 12 cobalt, about 20 chromium, about 11 nickel, about 5 silicon, about 1.5 molybdenum, about 2 copper, up to about 0.2 nitrogen and the ratio is about 2.5.

4. The stainless steel of claim 1 in the form of a casting or a wrought product or a hard-facing material or a welding material or a sintered powder metallurgy product.

5. The alloy of claim 1 containing about 30% ferrite.

* * * * *